United States Patent
Agrawal et al.

(10) Patent No.: US 9,312,991 B2
(45) Date of Patent: Apr. 12, 2016

(54) PACKET LOSS RECOVERY ON A WIRELESS LINK IN A TRANSMISSION LAYER PROTOCOL SESSION

(71) Applicant: International Business Machines Corporation, Armonk, NY (US)

(72) Inventors: Dakshi Agrawal, Monsey, NY (US); Bruce O. Anthony, Pine Island, MN (US); Franck Le, White Plains, NY (US); Robert B. Nicholson, Hampshire (GB); Vasileios Pappas, Elmsford, NY (US); Dinesh C. Verma, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 13/644,474

(22) Filed: Oct. 4, 2012

(65) Prior Publication Data
US 2014/0071833 A1    Mar. 13, 2014

Related U.S. Application Data

(63) Continuation of application No. 13/614,203, filed on Sep. 13, 2012.

(51) Int. Cl.
*H04L 1/00* (2006.01)
*H04L 1/18* (2006.01)

(52) U.S. Cl.
CPC ............ *H04L 1/1877* (2013.01); *H04L 1/0084* (2013.01)

(58) Field of Classification Search
None
See application file for complete search history.

(56) References Cited

U.S. PATENT DOCUMENTS

| | | | |
|---|---|---|---|
| 6,591,382 B1 | 7/2003 | Molloy et al. | |
| 8,005,966 B2 | 8/2011 | Pandya | |
| 2007/0033496 A1* | 2/2007 | Cooklev | H04L 1/1838 714/776 |
| 2008/0117904 A1* | 5/2008 | Radha et al. | 370/389 |
| 2008/0212582 A1* | 9/2008 | Zwart et al. | 370/390 |
| 2009/0249133 A1* | 10/2009 | Pons et al. | 714/701 |

(Continued)

FOREIGN PATENT DOCUMENTS

GB    2432490 B    6/2009
WO    WO 2011045553 A1    4/2011

OTHER PUBLICATIONS

Waters, Tim, "Programmable Deep Packet Inspection (DPI) for Service Providers," bivio networks, Dec. 17, 2007, http://www.convergedigest.com/bp/bp1.asp?ID=500&ctgy=.

(Continued)

*Primary Examiner* — Jutai Kao
(74) *Attorney, Agent, or Firm* — Ryan, Mason & Lewis, LLP

(57) ABSTRACT

Methods and apparatus are provided for recovering from packet loss in an end-to-end network connection having at least one wireless segment. A packet on a wireless segment of an end-to-end network connection is processed by determining whether the packet comprises one or more of a lost packet and a malformed packet; and generating a modified packet for an application associated with the packet to replace one or more of the lost packet and the malformed packet if the application is substantially tolerant to one or more of lost and malformed data. The modified packet comprises, for example, a non-original packet and/or a corrected packet. Link layer information or information from a deep packet inspection can be used to determine whether the packet comprises a lost packet or a malformed packet.

12 Claims, 3 Drawing Sheets

(56) References Cited

U.S. PATENT DOCUMENTS

| | | |
|---|---|---|
| 2010/0103837 A1 | 4/2010 | Jungck et al. |
| 2010/0189084 A1* | 7/2010 | Chen et al. ............... 370/338 |
| 2010/0284281 A1* | 11/2010 | Sperschneider ............ 370/242 |
| 2011/0019581 A1* | 1/2011 | Chin ........................... 370/253 |
| 2011/0213869 A1 | 9/2011 | Korsunsky et al. |
| 2011/0216707 A1 | 9/2011 | Farley et al. |
| 2011/0219426 A1 | 9/2011 | Kim et al. |
| 2014/0056307 A1* | 2/2014 | Hutchison ............ H04L 49/552 370/394 |

OTHER PUBLICATIONS

Lynch, Pierre, "IXIA, DPI and Multiplay in the mobile packet core network," IXIA, Jul. 2008.

Radha et al., "A New Solution to Improve the Link Failure Tolerancein Mobile Ad hoc Networks," IEEE Indicon 2005 Conference, Chennai, India, Dec. 11-13, 2005.

* cited by examiner

PACKET LOSS RECOVERY ON A WIRELESS LINK IN A TRANSMISSION LAYER PROTOCOL SESSION

CROSS-REFERENCE TO RELATED APPLICATION

This application is a continuation of U.S. patent application Ser. No. 13/614,203, filed Sep. 13, 2012, incorporated by reference herein.

FIELD OF THE INVENTION

The present invention relates generally to packet transmissions, and, more particularly, to techniques for recovering from packet loss.

BACKGROUND OF THE INVENTION

The Transmission Control Protocol (TCP) regulates the flow of packets between two networking endpoints over the Internet. The TCP protocol is designed so that the two endpoints can regulate packet flow between them and adjust the flow according to the congestion in the network without involving intermediate network nodes. The TCP protocol has proven robust for a variety of networks and link characteristics. See, for example, Hari Balakrishnan et al., "A Comparison of Mechanisms for Improving TCP Performance Over Wireless Links," IEEE ACM Trans. On Networking, Vol. 5, Issue 6, 756-769 (December 1997).

Under certain network conditions, however, the TCP protocol flow control can result in an overall packet throughput that is less than optimal. In the case of a wireless link, for example, packet losses can often occur due to poor radio propagation characteristics. The packet loss is often due to packets colliding on the wireless link, which is typically the final segment of the end-to-end connection. In response, however, the transmitter at the originating endpoint will reduce the transmission rate, thereby unnecessarily degrading performance of the entire end-to-end connection.

A need therefore exists for improved techniques for recovering from packet loss in an end-to-end network connection having at least one wireless segment.

SUMMARY OF THE INVENTION

Generally, methods and apparatus are provided for recovering from packet loss in an end-to-end network connection having at least one wireless segment. According to one aspect of the invention, a packet on a wireless segment of an end-to-end network connection is processed by determining whether the packet comprises one or more of a lost packet and a malformed packet; and generating a modified packet for an application associated with the packet to replace one or more of the lost packet and the malformed packet if the application is substantially tolerant to one or more of lost and malformed data.

In various embodiments, the modified packet comprises, for example, a non-original packet and/or a corrected packet. The non-original packet optionally conforms to semantic requirements of a network layer, a transmission layer and/or an application layer. The non-original packet is optionally generated using application semantic information from a deep packet inspection. The corrected packet optionally corrects one or more bits in the malformed packet to conform to application layer semantic requirements.

According to another aspect of the invention, link layer information or information from a deep packet inspection is used to determine whether the packet comprises a lost packet or a malformed packet.

A more complete understanding of the present invention, as well as further features and advantages of the present invention, will be obtained by reference to the following detailed description and drawings.

DETAILED DESCRIPTION OF PREFERRED EMBODIMENTS

Embodiments of the present invention provide improved techniques for recovering from a packet loss in an end-to-end network connection having at least one wireless segment. Aspects of the present invention improve the performance of end-to-end protocols (e.g., TCP and UDP) by exploiting physical, MAC, and application layer capabilities. In one embodiment, the present invention exploits physical and MAC layer knowledge to differentiate different kinds of packet losses and application layer capabilities to determine whether malformed or non-original packets should be used for a particular flow at a given time. Application semantics can be evaluated to determine whether packet retransmissions are needed or whether a particular piece of application data is essential at the application layer.

Aspects of the invention thus improve link layer protocols by using additional measurements from the physical layer to distinguish losses caused by fading. Another aspect of the invention improves the performance of end-to-end protocols (e.g., TCP and UDP) by injecting non-original packets or allowing malformed packets to be delivered at the application, whenever these packets can be recovered or can be handled at the application layer.

Figure 1:
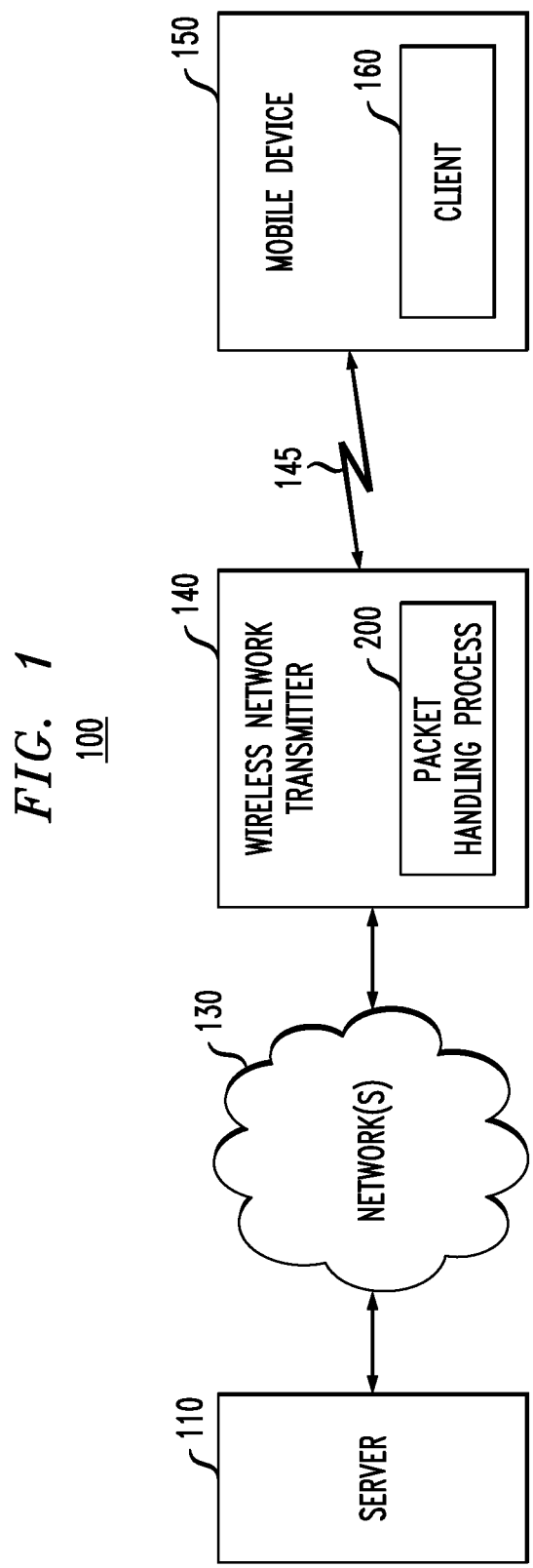
FIG. 1 illustrates an exemplary network environment in which the present invention can be implemented.

FIG. 1 illustrates an exemplary network environment 100 where the present invention can be implemented. As shown in FIG. 1, the exemplary network environment 100 comprises a server 110 that communicates with a client 160 on a mobile device 150 over one or more networks 130. The network(s) 130 may be embodied, for example, as one or more wired and/or wireless networks, such as the Internet, the Public Switched Telephone Network (PSTN), a digital satellite service, a cable network, one or more local area networks (LANs), and/or one or more wide area networks (WANs).

The end-to-end network connection between the server 110 and the mobile client 160 has at least one wireless segment, such as a wireless link 145. As shown in FIG. 1, a wireless network transmitter 140 transmits to the mobile client 160 over the wireless link 145. The wireless network transmitter 140 may be embodied, for example, as one or more of a wireless base station and a wireless access point. The exemplary wireless network transmitter 140 implements a packet handling process 200, as discussed further below in conjunction with FIG. 2, to implement an embodiment of the present invention for upstream flows. In a further variation, the exemplary mobile device 150 (or any other wireless receiver) implements a packet handling process 200, as discussed further below in conjunction with FIG. 2, to implement an embodiment of the present invention for downstream flows.

Embodiments of the invention recognize that a number of packet losses are caused by fading and not by congestion (which is the motivation for reducing the transmission rate in the event of packet loss). While the losses caused by fading should be masked from the TCP protocol in accordance with aspects of the present invention, losses caused by the congestion should be presented up to the TCP protocol. Additional embodiments of the present invention use measurements from the physical and/or MAC layer to estimate radio related losses and inform the link layer protocols.

Another aspect of the invention recognizes that a number of applications, such as video applications, can accommodate certain packet losses without requiring that lost or corrupted packets are retransmitted. For example, for exemplary video applications, decoders are able to recover from lost or corrupted packets using a number of techniques, such as extrapolating between consecutive frames and perceptual concealment. Nonetheless, most video today is delivered using the TCP protocol that guarantees reliable packet delivery, since most firewalls and proxies will allow HTTP to pass.

Aspects of the invention use application layer DPI (Deep Packet Inspection) to determine that a particular end-to-end flow (or portion of a flow) does not require reliable packet delivery and uses the link layer to efficiently retransmit the "lost packet." Note that under current protocols, the link layer still has to retransmit the packet because if the packet is not received, then the TCP protocol will stall at the receiver and further packets will not be delivered to the application layer at the receiver.

Aspects of the present invention extend existing link layer protocols (at the mobile node and/or the base station) as follows:

a) The link layer can provide notifications to the higher protocol layers about the lost packets belonging to particular flows (this requires the link layer to be able to reliably receive the first few bytes of a packet that identify the end-to-end flow); and/or b) The link layer can deliver malformed packets (e.g., packets with checksum errors) to higher layer protocols for particular flows (this again requires the link layer to be able to reliably receive the first few bytes of a packet that identify the end-to-end flow).

With this information (e.g., notification of lost packet or delivery of malformed packets), higher layer protocols can make a decision regarding how to handle the situation, using application layer information. Using deep-packet inspection (DPI) techniques, end-to-end flows can be classified in terms of their tolerance of lost or malformed packets and in terms of their end-to-end re-transmission policies for lost packets.

As discussed further below in conjunction with FIG. 2, combining this information (e.g., link layer information of lost or malformed packets and application layer semantics), the packet delivery at the transmission layer protocol (e.g., TCP and UDP) can be modified as follows:

1) In the case of lost packet notifications, a determination is made about whether the application can tolerate the injection of a non-original packet (e.g., a fake packet) and whether it is beneficial in terms of the performance of the end-to-end protocol. For example, if the information previously collected with the use of deep packet inspection techniques indicates that the end-to-end flow carries an MPEG video and the lost packet corresponds to a B frame of the MPEG stream, then the application can tolerate non-original packets. Then, if the transmission protocol is identified as the TCP protocol, and it is determined that non-delivery of the packet will result in the TCP protocol re-transmission and reduction of the TCP congestion window, a determination is made about whether to generate a non-original packet, that conforms with the network and transmission layer protocol semantics (e.g., the generated non-original packet has the correct checksums, and sequence numbers) and preferably still follows the application semantics (e.g., a well-formed B frame in this example). The non-original packet is then delivered to the transmission layer and then to the application layer. At that point, depending on the application, the handling of the non-original packet can be different. Some applications may discard the non-original packet as an error if the non-original packet fails some of the application checks or may consume the non-original packet as being an original packet.

2) In the case of malformed packets, a similar approach can be followed. The main difference, compared to the lost packet case discussed above, where the lost packet is replaced with a non-original packet, is that in this case the packet exists but some of bits of the received packet (e.g., the bits belonging to application portion of the packet) are malformed. Again, using information previously collected from deep packet inspection techniques, a determination can be made about whether the application can handle the malformed packet. If the application can handle the malformed packet, then using knowledge of the transmission protocol, a determination can be made about whether it is preferable to deliver the malformed packet to the application or whether it is better to consider the malformed packet as a lost packet and let the transmission protocols or the link layer protocols deal with its recovery.

Figure 2:
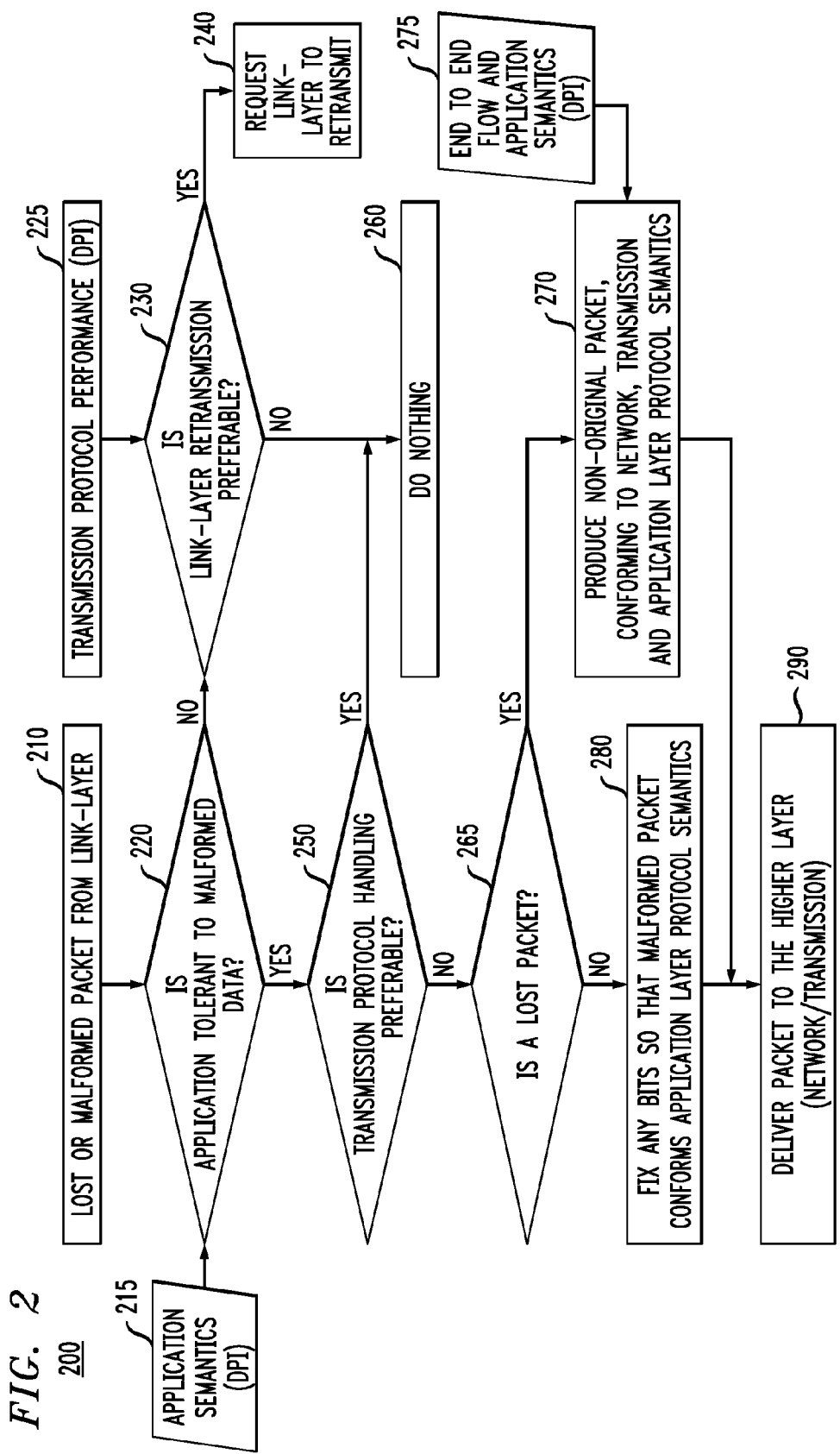
FIG. 2 is a flow chart describing exemplary implementation of a packet handling process, incorporating features of the present invention.

FIG. 2 is a flow chart describing an exemplary implementation of a packet handling process 200, incorporating features of the present invention. Generally, the exemplary packet handling process 200 introduces new logic between the link layer protocols and higher layer protocols (network and transmission layer).

As shown in FIG. 2, the exemplary packet handling process 200 is initiated during step 210 upon receipt of a lost or malformed packet from the link-layer.

A test is performed during step 220 to determine if the application is tolerant to malformed data, using application semantics (DPI) 215 (e.g., by inspecting file type and/or an IP address of the source). If it is determined during step 220 that the application is not tolerant to malformed data, then a further test is performed during step 230 to determine if a link layer retransmission is preferable. If a link layer retransmission is preferable, then the link-layer is requested to retransmit the packet during step 240. If a link layer retransmission is not preferable, then no action is taken during step 260 (e.g., don't ask the sender to resend, but wait for the sender to resend upon a timeout).

If, however, it is determined during step 220 that the application is tolerant to malformed data, then a further test is performed during step 250 to determine if transmission protocol handling is preferable. If it is determined during step 250 that transmission protocol handling is preferable, then no action is taken during step 260.

If, however, it is determined during step 250 that transmission protocol handling is not preferable, then a further test is performed during step 265 to determine if the packet is a lost packet or a malformed packet. If it is determined during step 265 that the packet is a lost packet (e.g., receiver does not receive anything but a collision indicator), then a non-original packet is generated during step 270, conforming to network, transmission and application layer protocol semantics, using end-to-end flow and application semantics (DPI) 275. The generated non-original packet is then delivered to the higher layer (network/transmission layer) during step 290.

If, however, it is determined during step 265 that the packet is a malformed packet (e.g., only a portion of the packet collided and some valid data is received), then any malformed bits are fixed during step 280 so that the malformed packet conforms to application layer protocol semantics. The modified malformed packet is then delivered to the higher layer (network/transmission layer) during step 290.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory, and operative to, perform exemplary method steps.

Figure 3:
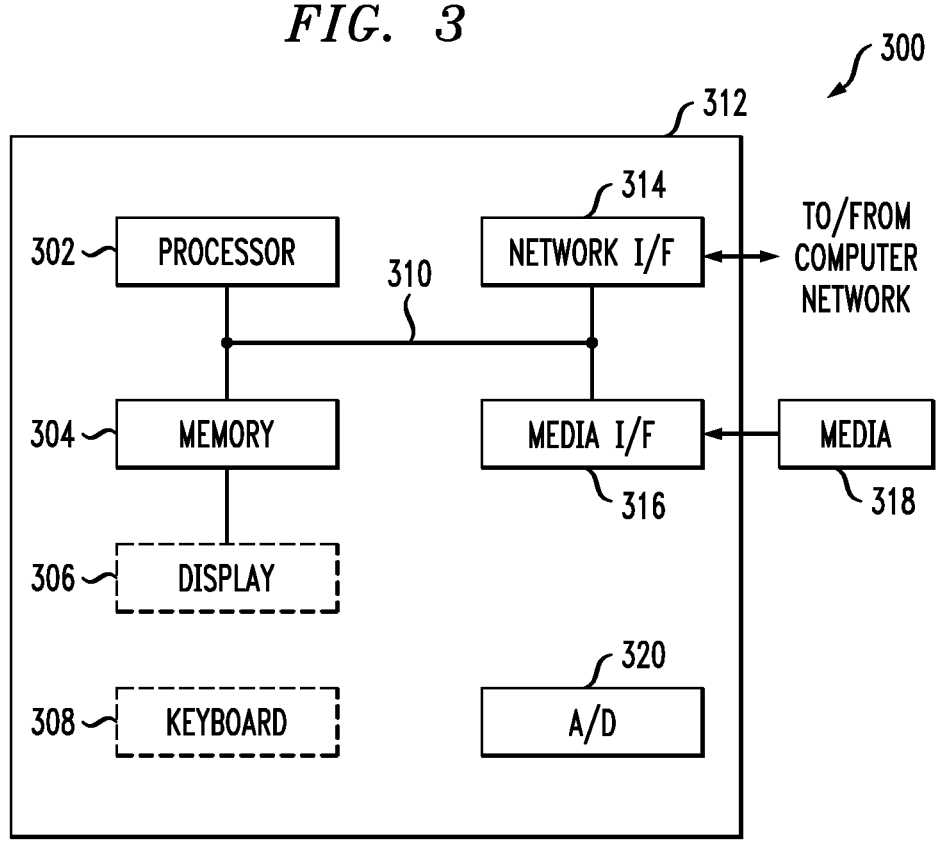
FIG. 3 depicts a computer system that may be useful in implementing one or more aspects and/or elements of the present invention.

One or more embodiments can make use of software running on a general purpose computer or workstation. FIG. 3 depicts an exemplary computer system 300 that may be useful in implementing one or more aspects and/or elements of the present invention. For example, one or more of wireless network transmitter 140 and mobile client 160 of FIG. 1 can be implemented using the computer system 300. With reference to FIG. 3, such an implementation might employ, for example, a processor 302, a memory 304, and an input/output interface formed, for example, by a display 306 and a keyboard 308.

The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Analog-to-digital converter(s) 320 may be provided to receive analog input, such as analog video feed, and to digitize same. Such converter(s) may be interconnected with system bus 310.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take ally of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 402. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus for processing a packet on a wireless segment of an end-to-end network connection, said apparatus comprising:
a memory; and
at least one hardware device, coupled to the memory, operative to:
obtain said packet from a link layer;
determine whether said packet comprises one or more of a lost packet and a malformed packet;
inspect said packet in a transport layer to retrieve application semantic information from said packet used to determine if an application associated with said packet is substantially tolerant to one or more of lost and malformed data based on one or more of information from said link layer and information from a deep packet inspection; and
generate one or more of a non-original packet and a corrected packet for said application associated with said packet to replace one or more of said lost packet and said malformed packet if said application is substantially tolerant to one or more of lost and malformed data, wherein said non-original packet is generated using application semantic information from the deep packet inspection and conforms to semantic requirements of one or more of a network layer, a transmission layer and an application layer and wherein said link layer provides said non-original packet to the transmission layer with a lost packet notification for a particular end-to-end flow, and wherein said corrected packet corrects one or more bits in said malformed packet to conform to application layer semantic requirements and wherein said link layer provides said corrected packet for the particular end-to-end flow to a higher layer.

2. The apparatus of claim 1, wherein said determination and generation are performed by one or more of a wireless transmitter and a wireless receiver.

3. The apparatus of claim 1, wherein said wireless transmitter comprises one or more of a wireless base station and a wireless access point.

4. The apparatus of claim 1, wherein said at least one hardware device is further configured to request a resend of said packet.

5. The apparatus of claim 1, wherein said at least one hardware device is further configured to receive a resent version of said packet from a sender following a timeout period.

6. The apparatus of claim 1, wherein said at least one hardware device is further configured to request said link layer to retransmit the obtained packet.

7. An article of manufacture for processing a packet on a wireless segment of an end-to-end network connection, comprising a non-transitory machine readable storage medium containing one or more programs which when executed implement the steps of:
obtaining said packet from a link layer;
determining whether said packet comprises one or more of a lost packet and a malformed packet;
inspecting said packet in a transport layer to retrieve application semantic information from said packet used to determine if an application associated with said packet is substantially tolerant to one or more of lost and malformed data based on one or more of information from said link layer and information from a deep packet inspection; and
generating one or more of a non-original packet and a corrected packet for said application associated with said packet to replace one or more of said lost packet and said malformed packet if said application is substantially tolerant to one or more of lost and malformed data, wherein said non-original packet is generated using application semantic information from the deep packet inspection and conforms to semantic requirements of one or more of a network layer, a transmission layer and an application layer and wherein said link layer provides said non-original packet to a transmission layer with a lost packet notification for a particular end-to-end flow, and wherein said corrected packet corrects one or more bits in said malformed packet to conform to application layer semantic requirements and wherein said link layer provides said corrected packet for the particular end-to-end flow to a higher layer.

8. The article of manufacture of claim 7, wherein said steps are performed by one or more of a wireless transmitter and a wireless receiver.

9. The article of manufacture of claim 8, wherein said wireless transmitter comprises one or more of a wireless base station and a wireless access point.

10. The article of manufacture of claim 7, further comprising the step of requesting said link layer to retransmit the obtained packet.

11. The article of manufacture of claim 7, further comprising the step of requesting a resend of said packet.

12. The article of manufacture of claim 7, further comprising the step of receiving a resent version of said packet from a sender following a timeout period.

* * * * *